United States Patent
Gelfi et al.

(10) Patent No.: US 9,440,578 B2
(45) Date of Patent: Sep. 13, 2016

(54) ASSEMBLY OF A HEADLIGHT AND A DEVICE FOR MOUNTING SAME, WHICH REDUCES THE AMOUNT OF REPAIRS TO THE ADJACENT FENDER UPON AN IMPACT, AND RELATED VEHICLE

(71) Applicant: RENAULT s.a.s., Boulogne-Billancourt (FR)

(72) Inventors: Sylvain Gelfi, Paris (FR); Raphael Dahan, Versailles (FR); Ronan Bouguyon, Magny les Hameaux (FR); Herve Sanchez, Morsang sur Orge (FR); Ayla Shakourzadeh, Paris (FR)

(73) Assignee: RENAULT s.a.s., Boulogne-Billancourt (FR)

( * ) Notice: Subject to any disclaimer, the term of this patent is extended or adjusted under 35 U.S.C. 154(b) by 0 days.

(21) Appl. No.: 14/360,156

(22) PCT Filed: Oct. 30, 2012

(86) PCT No.: PCT/EP2012/071501
§ 371 (c)(1),
(2) Date: May 22, 2014

(87) PCT Pub. No.: WO2013/075916
PCT Pub. Date: May 30, 2013

(65) Prior Publication Data
US 2014/0313764 A1    Oct. 23, 2014

(30) Foreign Application Priority Data

Nov. 24, 2011 (FR) ...................................... 11 60724

(51) Int. Cl.
*B60Q 1/04* (2006.01)
(52) U.S. Cl.
CPC ........... *B60Q 1/0425* (2013.01); *B60Q 1/0491* (2013.01)

(58) Field of Classification Search
CPC .... B60Q 1/04; B60Q 1/0425; B60Q 1/0491; B60Q 1/0441; B60Q 1/04466; B60Q 1/0483; B62D 25/00; F21S 48/30
USPC ........................................................ 362/460
See application file for complete search history.

(56) References Cited

U.S. PATENT DOCUMENTS 8,465,171 B2 * 6/2013 Kishimoto et al. ........... 362/230
2003/0142503 A1    7/2003 Ericsson et al.

FOREIGN PATENT DOCUMENTS

| EP | 1 048 521 | 11/2000 |
|----|-----------|---------|
| EP | 1 332 915 | 8/2003 |
| FR | 2 895 954 | 7/2007 |

OTHER PUBLICATIONS

International Search Report Issued Feb. 1, 2013 in PCT/EP12/071501Filed Oct. 30, 2012.
French Search Report Issued Aug. 3 , 2012 in French Patent Application No. 1160724 Filed Nov. 24, 2011.

* cited by examiner

*Primary Examiner* — Sharon Payne
(74) *Attorney, Agent, or Firm* — Oblon, McClelland, Maier & Neustadt, L.L.P.

(57) ABSTRACT

An assembly includes a motor vehicle headlamp and a mounting device to mount the headlamp on the vehicle. The headlamp includes a casing. The mounting device includes a pivot connection that pivots about a fixed rotation axis with respect to the technical front end of the vehicle, which carries the cooling unit for the propulsion unit of the vehicle. The rotation axis is contained in the longitudinal plane of the vehicle and is positioned such that an impact along a line of force located on one side of the rotation axis causes an edge of the headlamp raise above the adjacent edge of the fender on the other side of the rotation axis. The headlamp is shaped and the rotation axis is oriented such that the headlamp pivots about this rotation axis, remaining inscribed within a predetermined surface of revolution outside the contour of the adjacent fender.

11 Claims, 2 Drawing Sheets

ASSEMBLY OF A HEADLIGHT AND A DEVICE FOR MOUNTING SAME, WHICH REDUCES THE AMOUNT OF REPAIRS TO THE ADJACENT FENDER UPON AN IMPACT, AND RELATED VEHICLE

The invention relates to an assembly of a headlamp and a device for mounting same that limits repairs to the adjacent fender in the event of an impact, and to a corresponding vehicle.

BACKGROUND

A headlamp, also sometimes known as an optical unit, is generally formed by a casing that encloses one or more light sources and by means for fixing to structural elements of the vehicle.

Currently, motor vehicle manufacturers design the connections between the headlamp and the structural elements of the vehicle such that the dynamics of the headlamp meet a number of requirements in the event of a frontal impact.

These criteria are essentially the criteria associated with pedestrian impacts, with damage to the surrounding components in the event of a frontal impact or to the design of the vehicle.

Specifically, the dynamics of a headlamp must be compatible with a pedestrian impact in order to reduce the risk of injury, for example in the region of the hip, femur or tibia.

In particular, regulations impose constraints with regard to tibia impacts. In order to respect these regulations, some manufacturers have added a relatively soft absorber in front of the impact cross member of the vehicle, having the effect of increasing the crumple distance of the vehicle under an equal amount of frontal impact energy.

Furthermore, for hip/tibia/femur pedestrian impacts, it is preferable for the dynamics to allow the headlamp to move backward so as to reduce the risks of injury. This has led to the removal of some connections, one of the functions of which was to prevent the headlamp from moving backward in the event of a frontal impact.

Furthermore, headlamps are becoming increasingly voluminous on account of vehicle design and the integration of new functions. Developments in vehicle design mean that the protection of the headlamp with respect to obstacles is becoming increasingly weak.

All of these factors increase the exposure of headlamps to frontal impacts and the amplitude of their movement. The direct effect of this is to increase the risks of damage to surrounding components, in particular the front fender, in the event of impacts.

Solutions exist which limit the damage to the front fender by the headlamp in the event of a frontal impact.

One solution, described in document FR 2 850 719 consists of a system of pivoting pins that allow the fender to be detached from its support under the action of the headlamp without being damaged. Such a solution, in order to operate optimally, requires the fender to be fixed to the structure of the vehicle along a vertical axis, and this may be a constraint in the assembly process of the vehicle.

Another solution, described in document FR 2 895 954 A1 comprises the production of a connecting member that is disposed under the casing of the headlamp and pivots about a vertical axis disposed in a housing at the head of the front chassis frame side rail of the vehicle. In the event of a frontal impact, the connecting member pivots and causes the casing to pivot toward the outside of the vehicle without damaging the fender. This solution requires the presence of a clearance between the fender and the casing of the headlamp, concealed by a trim molding, and the production of a pivoting connecting member.

SUMMARY

One objective of the present invention is to propose a headlamp and a device for mounting same that limits damage to the adjacent fender in the event of a frontal impact, this headlamp and the device for mounting same not having a mobile connecting piece and allowing the headlamp to be positioned with respect to an adjacent fender of the vehicle without an additional clearance as compared with a conventional solution. Furthermore, the present invention does not require a particular fixing means for the neighboring fender.

To this end, the present invention relates to an assembly comprising a motor vehicle headlamp and a device for mounting same on structural elements of the vehicle, said headlamp comprising a casing that encloses at least one light source and is intended to be mounted at least partially along one edge of a fender of the vehicle, characterized in that the mounting device comprises a pivot connection that pivots about a fixed rotation axis with respect to a structural element of the vehicle, formed by the technical front end of the vehicle, said technical front end carrying the cooling unit for the propulsion unit of the vehicle, the rotation axis being contained in the longitudinal plane of the vehicle and being positioned such that an impact along a line of force located on one side of the rotation axis causes an edge of the headlamp to be raised above the adjacent edge of the fender on the other side of the rotation axis, and in that the headlamp is shaped and the rotation axis is oriented such that the headlamp pivots about this rotation axis, remaining inscribed within a predetermined surface of revolution outside the contour of the adjacent fender.

The expression "outside the contour of the fender" is understood to mean that the surface of revolution does not have any point in common with the contour of the fender or with the fender surface that is defined by this contour. This means that there is no conflict between the envelope in which the headlamp is inscribed when moving, on the one hand, and the edge or contour of the fender, on the other hand. This feature of the headlamp and the device for mounting same ensures that no part of the headlamp can come into contact with the fender by rotation about the fixed axis, such that the fender will not be damaged by the rotation of the headlamp.

Furthermore, the mounting device does not require the existence of a clearance between the fender and the mounted headlamp and is entirely independent of the means of fixing the fender. The assembly according to the invention thus makes it possible to maintain a small mounting clearance between the headlamp and the adjacent fender, for example of around 1 to 2 mm, or even of 1.5 to 1.8 mm.

The surface of revolution may be determined by calculation and may in particular be determined for a rotation through an angle of 0 to 30° about said rotation axis, preferably a rotation through an angle of 0 to 20°, or else of 0 to 15°.

The 0 angle position corresponds to the position in which the headlamp is mounted on the structural elements of the vehicle, in the normal use position, prior to any rotation caused by an impact.

The pivot connection may be produced by means of two members that are shaped to cooperate in rotation, one of the members being secured to the casing and the other member being intended to be fixed to a structural element of the vehicle.

In particular, the member secured to the casing may be produced in one piece with the casing, for example by molding an appropriate plastics material.

The mounting device may likewise comprise a fixed support for the member intended to be secured to a structural element of the vehicle, said fixed support being shaped to be secured to the structural element of the vehicle.

In particular, the fixed support and the member that it carries will advantageously be produced in one piece, for example a piece produced by molding from appropriate plastics material, thereby making it possible to produce the member and its support.

In one embodiment of the pivot connection, one of the members comprises an end that is shaped to cooperate in rotation with a finger that forms the other member of the pivot connection.

When the position of the headlamp on the vehicle requires that the headlamp and the device for mounting same meet the requirements of pedestrian impacts in particular pedestrian impacts of the hip or tibia/femur type, provision may be made for the pivot connection to be collapsible.

This collapsibility may be obtained in various ways, for example by the provision of one or more areas of weakness that are generally determined by calculation (thinning, change of material) on at least one of the members that form the pivot connection.

When the device for mounting the headlamp comprises at least two collapsible fixing lugs for fixing the casing to structural elements of the vehicle, the collapsibility of the pivot connection will be determined such that the pivot connection breaks after the collapsible fixing lugs, in order that the headlamp can pivot sufficiently in the period of time between the breakage of the collapsible fixing lugs and the breakage of the pivot connection, so as to avoid damage to the fender.

The collapsibility of the pivot connection will also preferably be determined in order that the pivot connection breaks under forces that are tolerable by a hip.

On account of being fixed to a fixed structural element of the vehicle, the rotation axis may be inclined freely and may be modified depending on the arrangement and the shape of the surrounding components, in particular of the fender and of the fender support.

The inclination of the rotation axis will also depend on the shape of the adjacent fender.

For example, for a headlamp that has an approximately rectilinear edge along which a corresponding substantially rectilinear edge of the fender of the vehicle extends when the headlamp is mounted on the vehicle, the pivot connection is shaped such that the rotation axis is approximately parallel to said approximately rectilinear edge of the headlamp.

An approximately rectilinear edge of the fender is understood to be an edge which may be strictly rectilinear but which may be slightly rounded or curved. What is meant here is an edge which does not turn back with respect to the rear region of the headlamp. In this region, the edge typically forms an angle greater than 90° and more conventionally around 180°, this angle being considered between two contiguous segments that are close to this rear region of the headlamp (cf. FIGS. 4 and 5 presented hereinbelow).

For a headlamp having a bent edge along which a corresponding bent edge of the fender of the vehicle extends when the headlamp is mounted on the vehicle, the pivot connection is shaped such that the rotation axis extends approximately vertically.

A bent edge of the fender is understood to mean an edge which forms an angle less than 90°. It is understood to be a fender edge which turns back at an acute angle around a rear region of the headlamp (cf. FIG. 3 presented hereinbelow, which illustrates the case of an angle of around 45°).

The invention also relates to a motor vehicle having at least one assembly according to the invention comprising a motor vehicle headlamp and a device for mounting same on structural elements of the vehicle, characterized in that the pivot connection is produced between the casing of the headlamp and a fixed structural element of the vehicle, typically the technical front end of the vehicle. In variant embodiments, the fixed structural element of the vehicle may be a cowl-side reinforcing member, a chassis frame side rail or a front cross member.

BRIEF DESCRIPTION OF THE DRAWINGS

An embodiment of the invention will now be described by way of nonlimiting example of the invention and with reference to the appended drawings, in which.

DETAILED DESCRIPTION

In the present description, the terms front, rear, upper and lower refer to the front and rear directions of the vehicle when the headlamp is mounted on the vehicle. The axes X, Y and Z correspond respectively to the longitudinal axis (from front to rear), transverse axis and vertical axis of the vehicle.

Figure 1:
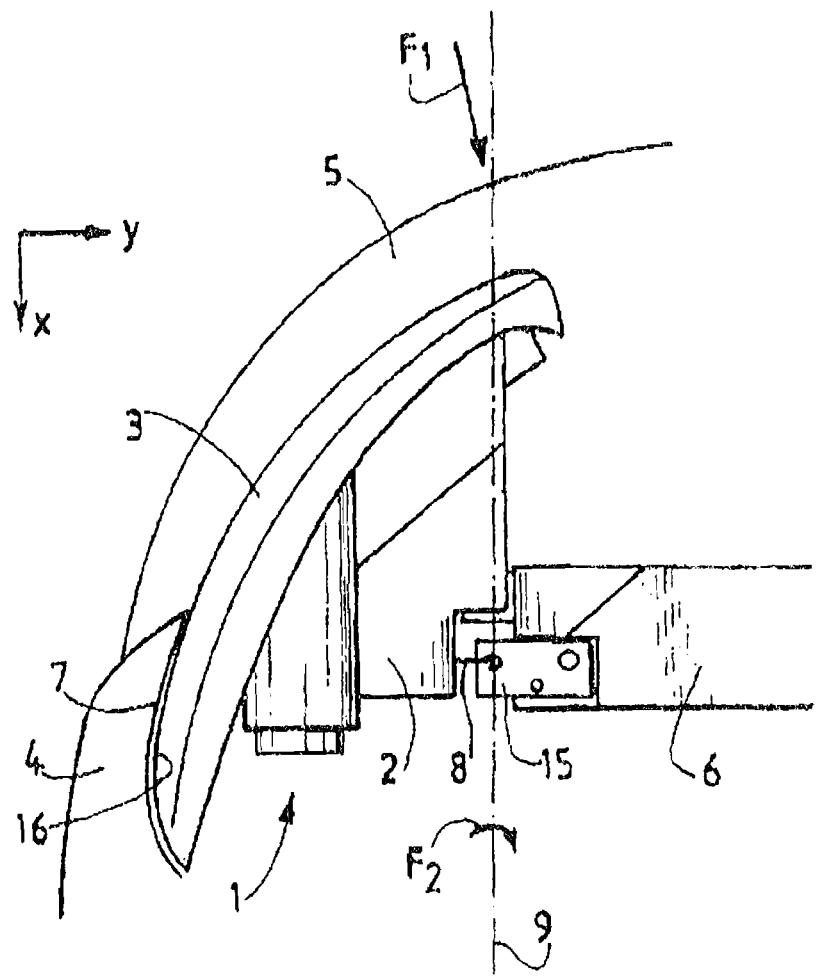
FIG. 1 is a top view of the front part of a vehicle having an assembly according to the invention.

With reference to FIG. 1, a front headlamp 1 of the vehicle is shown, said headlamp 1 comprising a casing 2 equipped with a lens 3, enclosing one or more light sources (not shown).

Also partially shown in FIG. 1 are a fender 4, the lower part of the front apron 5 and the technical front end (TFE) 6 of the vehicle, said technical front end conventionally supporting the cooling unit for the propulsion unit (radiator, fan etc.) and connecting structural elements of the vehicle.

The headlamp 1 is mounted in part along one edge 7 of the fender 4 of the vehicle, as can be seen in FIGS. 1 and 3-5.

A mounting device mounts the headlamp on the structural elements of the vehicle.

This mounting device comprises at least two fixing lugs for fixing the casing to structural elements of the vehicle, or even at least three fixing lugs for ensuring the isostaticity of the headlamp. These fixing lugs are collapsible fixing lugs designed to break under the effect of a predetermined impact.

These collapsible fixing lugs are not shown in the figures. Conventionally, they connect the casing of the headlamp to structural elements of the vehicle, such as for example the TFE 6, the forwardmost cross member (not shown), the fender support (not shown) or other parts of the chassis of the vehicle.

According to the invention, the mounting device comprises a pivot connection 8 that pivots about a rotation axis 9 that is fixed with respect to a structural element of the vehicle. This pivot connection 8 is shown schematically in FIG. 1. This arrangement allows the headlamp to rotate about the rotation axis 9.

In the example shown, this pivot connection 8 is produced by means of two members that are shaped to cooperate in rotation, one of the members 10 being secured to the casing and the other member 11 being intended to be fixed to a structural element of the vehicle, preferably a fixed structural element.

Figure 2:
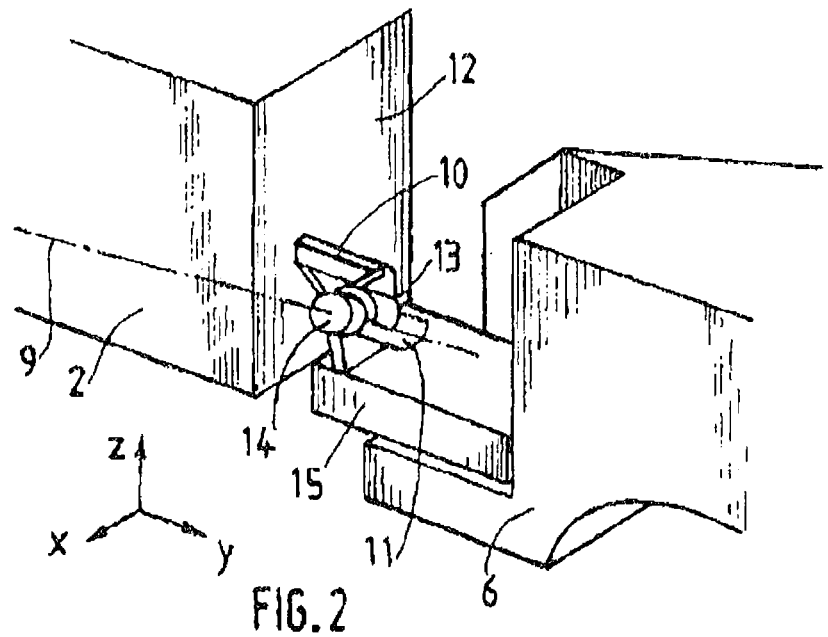
FIG. 2 is a perspective view of the rear of the assembly shown in FIG. 1.

These elements are visible in FIG. 2, which partially shows the casing 2 of the headlamp and the TFE 6.

In the example shown, the member 10 is secured to the casing 2, and in particular to an approximately vertical face 12 of the latter, said face being located at the rear of the casing 2, in the vicinity of the TFE 6.

The free end 13 of the member 10 that is secured to the casing 2 is a lug having a rounded shape that is shaped to cooperate with a cylindrical finger 11 that forms the other member of the pivot connection 8. The free end 14 of the cylindrical finger 11 forms a stop that prevents any movement in translation of the member 10 that is secured to the casing 2 with respect to the cylindrical finger 11.

The cylindrical finger 11 shown in the figures is produced in one piece with a fixed support 15 which is fixed to the TFE 6 by any suitable means, for example by adhesive bonding, screwing, riveting or the like.

The cylindrical finger 11 and the fixed support 15 thereof may thus be easily produced by molding from an appropriate plastics material.

Furthermore, in order to comply with the criteria of pedestrian impacts of the hip/femur type, the pivot connection 8 may be collapsible. To this end, one of the members of which it is made may be collapsible, or even both members of the pivot connection.

The collapsibility of the pivot connection will be determined such that the pivot connection breaks after the collapsible fixing lugs.

Furthermore, the headlamp 1 according to the invention is shaped and the rotation axis 9 is oriented such that, when the headlamp is mounted on the structural elements of the vehicle, the volume of the headlamp that pivots about this rotation axis is inscribed within a predetermined surface S of revolution outside the contour of the adjacent fender 4.

Figure 3:
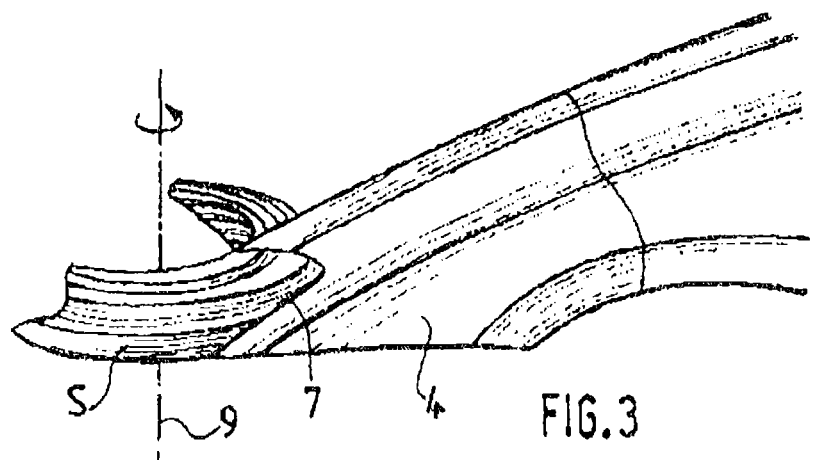
FIG. 3 is a perspective view of a fender of a vehicle and the surface of revolution of the headlamp pivoting about the axis of the pivot connection.

This surface of revolution S can be easily obtained by calculation and is shown in FIG. 3 for a particular type of fender 4.

In the example shown in FIG. 3, the rotation axis 9 of the pivot connection 8 is approximately vertical.

The surface of revolution S represents the surface described by the contours of the headlamp when it turns about the rotation axis 9: thus, the entire volume of the headlamp is contained within this surface of revolution S during the rotation of the headlamp 1 about the rotation axis 9, such that the headlamp cannot strike the adjacent fender 4.

It is not necessary to provide for the surface of revolution S of the headlamp to remain outside the contour of the adjacent fender 4 for the entire rotation amplitude of the headlamp about the rotation axis 9.

Figure 5:
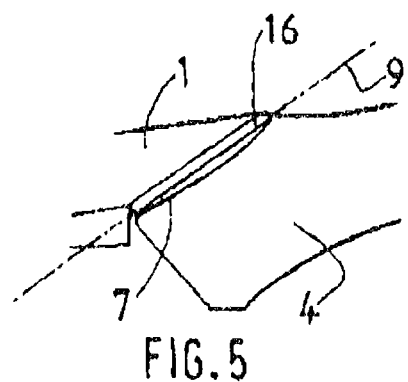

It is sufficient for this surface of revolution S to remain outside for a rotation through an angle of 0 to 30°, or even of 0 to 20°, namely a rotation which is sufficient for the edge of the headlamp to pass above the fender, as is shown in FIG. 5.

The orientation of the rotation axis 9 of the pivot connection 8 may vary depending on the shape of the fender 4.

When, in the position in which it is mounted on the vehicle, the headlamp 1 has an approximately rectilinear edge 16 along which a corresponding approximately rectilinear edge 7 of the fender 4 of the vehicle extends, corresponding to the embodiment in FIGS. 1, 2, 4 and 5, the pivot connection 8 is shaped such that the rotation axis 9 is approximately parallel to said approximately rectilinear edge 16 of the headlamp.

For such an arrangement, an impact along the arrow F1 in FIG. 1 will firstly cause the collapsible fixing lugs of the mounting device to break. The line of force F1 is located on one side of the rotation axis 9, and more precisely the inner side with respect to the engine compartment.

Figure 4:
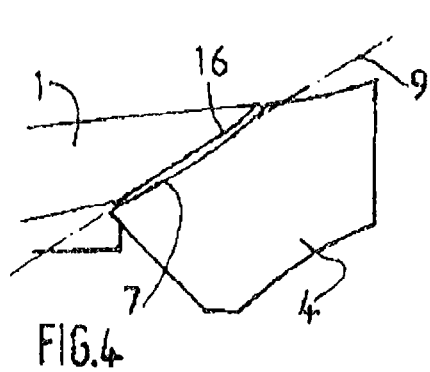
FIGS. 4 and 5 are side views of a headlamp and a fender before and after rotation of the headlamp, respectively.

The headlamp 1 is thus free to pivot about the rotation axis 9 following the arrow F2 in FIG. 1. This rotation causes the edge 16 of the headlamp to rise above the adjacent edge of the fender, as is shown in FIGS. 4 and 5, so as not to damage the fender 4. The edge 16 of the headlamp which rises is located on the opposite side of the headlamp with respect to the line of force F1. In particular, as soon as the rear edge of the headlamp 1 passes above the fender 4, the risks of the fender being damaged are considerably reduced, it then being possible for the headlamp to slide over the fender.

Next, if need be, the collapsible pivot connection 8 breaks, allowing the headlamp 1 to move back, this criterion being required in the event of a pedestrian impact of the hip or tibia/femur type.

When, in the position in which it is mounted on the vehicle, the headlamp 1 has a bent edge 16 along which a corresponding bent edge 7 of the fender 4 of the vehicle extends (for a fender having the shape as shown in FIG. 3), the pivot connection 8 is shaped such that the rotation axis 9 extends approximately vertically. The dynamics of the headlamp in the event of an impact are identical to those described above with reference to FIGS. 1, 2 and 4, 5.

In the embodiment described above (the case of a fender that turns back above a rear bent edge of the headlamp), the rotation axis 9 is vertical. However, depending on the design of the vehicle, the rotation axis 9 may be inclined with respect to the vertical, while remaining contained in a longitudinal plane of the vehicle.

The invention claimed is:
1. An assembly, comprising:
 a motor vehicle headlamp; and
 a mounting device to mount the headlamp on structural elements of a vehicle,
 said headlamp comprising a casing that encloses at least one light source and is intended to be mounted at least partially along one adjacent edge of a fender of the vehicle, wherein
 the mounting device comprises a pivot connection that pivots about a fixed rotation axis with respect to a structural element of the vehicle, formed by a technical front end of the vehicle, said technical front end carrying a cooling unit for a propulsion unit of the vehicle, the rotation axis being contained in the longitudinal plane of the vehicle and being positioned such that an impact along a line of force located on one side of the rotation axis causes an edge of the headlamp to be raised above the adjacent edge of the fender on the other side of the rotation axis,
 the headlamp is shaped and the rotation axis is oriented such that the headlamp pivots about this rotation axis, remaining inscribed within a predetermined surface of revolution outside the contour of the adjacent fender, and wherein the longitudinal plane of the vehicle is from a front end of the vehicle to a rear end of the vehicle.

2. The assembly as claimed in claim 1, wherein the surface of revolution is determined for a rotation through an angle of 0 to 30° about said rotation axis.

3. The assembly as claimed in claim 1, wherein the pivot connection is produced by two members that are shaped to cooperate in rotation, one of the members being secured to the casing and the other member being intended to be fixed to a structural element of the vehicle.

4. The assembly as claimed in claim 3, wherein the mounting device comprises a fixed support for the member intended to be secured to a structural element of the vehicle, said fixed support being shaped to be secured to the structural element of the vehicle.

5. The assembly as claimed in claim 4, wherein the fixed support and the member that it carries are produced in one piece.

6. The assembly as claimed in claim 3, wherein one of the members comprises an end that is shaped to cooperate in rotation with a finger that forms the other member of the pivot connection.

7. The assembly as claimed in claim 1, wherein said mounting device comprises at least two collapsible fixing lugs for fixing the casing to structural elements of the vehicle, and the pivot connection is collapsible, the collapsibility being determined such that the pivot connection breaks after the collapsible fixing lugs break.

8. The assembly as claimed in claim 1, wherein the headlamp has an approximately rectilinear edge along which a corresponding substantially rectilinear edge of the fender of the vehicle extends when the headlamp is mounted on the vehicle, and the pivot connection is shaped such that the rotation axis is approximately parallel to said approximately rectilinear edge of the headlamp.

9. The assembly as claimed in claim 1, wherein the headlamp has a bent edge along which a corresponding bent edge of the fender of the vehicle extends when the headlamp is mounted on the vehicle, and the pivot connection is shaped such that the rotation axis extends approximately vertically.

10. The assembly as claimed in claim 1, wherein the surface of revolution is determined for a rotation through an angle of 0 to 20° about said rotation axis.

11. A motor vehicle having at least one assembly as claimed in claim 1, wherein the pivot connection is produced between the casing of the headlamp and a fixed structural element of the vehicle selected from the technical front end of the vehicle, a cowl-side reinforcing member, a chassis frame side rail and a front cross member.

* * * * *